US006373277B1

United States Patent
(12) United States Patent
Felder

(10) Patent No.: US 6,373,277 B1
(45) Date of Patent: Apr. 16, 2002

(54) LINE DRIVER HAVING VARIABLE IMPEDANCE TERMINATION

(75) Inventor: Matthew D. Felder, Austin, TX (US)

(73) Assignee: Sigmatel, INC, Austin, TX (US)

( * ) Notice: Subject to any disclaimer, the term of this patent is extended or adjusted under 35 U.S.C. 154(b) by 0 days.

(21) Appl. No.: 09/790,282

(22) Filed: Feb. 22, 2001

(51) Int. Cl.$^{7}$ .............................................. H03K 17/16
(52) U.S. Cl. .............................. 326/30; 326/82; 326/26
(58) Field of Search .............................. 326/30, 83, 86, 326/89, 90, 26, 27, 82

(56) References Cited

U.S. PATENT DOCUMENTS

| | | | | |
|---|---|---|---|---|
| 4,441,068 A | * | 4/1984 | Smith | 326/89 |
| 5,532,624 A | * | 7/1996 | Khoury | 326/98 |
| 6,100,717 A | | 8/2000 | May | |

OTHER PUBLICATIONS

Timeless Ideas for Design–Jul. 10, 2000 (originally published Mar. 6, 1995)—"Positive Feedback Terminates Cables", by Jerry Steele, National Semiconductor Corp., Tucson Design Center, 940 Finance Center Dr. Suuite 120, Tucson, AZ 85710.

* cited by examiner

*Primary Examiner*—Michael Tokar
*Assistant Examiner*—Don Phu Le
(74) *Attorney, Agent, or Firm*—Timothy W Markison

(57) ABSTRACT

A line driver having variable impedance termination includes an impedance, a 1$^{st}$ variable feedback, a 2$^{nd}$ variable feedback, a summing module and a gain module. The 1$^{st}$ and 2$^{nd}$ variable feedbacks provide feedback based on the desired impedance for the particular application. The summing module is operably coupled to sum the 1$^{st}$ variable feedback, the 2$^{nd}$ variable feedback and a signal to produce a resultant signal. The gain module is operably coupled to receive the resultant signal and to amplify the signal to produce a gained signal. The output of the gain module is operably coupled to the impedance wherein the other node of the impedance provides the output of the line driver. To provide the feedback, the 1$^{st}$ variable feedback is operably coupled to the output of the gain module and the summing module and the 2$^{nd}$ variable feedback is operably coupled to the output of the line driver and the summing module.

15 Claims, 5 Drawing Sheets

LINE DRIVER HAVING VARIABLE IMPEDANCE TERMINATION

TECHNICAL FIELD OF THE INVENTION

This invention relates generally to communication systems and more particularly to line drivers for use in such communication systems.

BACKGROUND OF THE INVENTION

As is known, data may be communicated from one entity (e.g., end users computer, server, facsimile machine, et cetera) to another entity via a communication infrastructure. The communication infrastructure may include a public switch telephone network (PSTN), the Internet, wireless communication system, and/or a combination thereof. Such a communication infrastructure supports many data communication protocols, which prescribe the software and/or hardware for accurate transmission of data from one entity to another. Such data communication protocols include digital subscriber line (DSL), asymmetrical digital subscriber line (ADSL), universal asymmetrical digital subscriber line (UADSL or G.Lite), high-speed digital subscriber line (HDSL), symmetrical high-speed digital subscriber line (HDSL), asynchronous transfer mode (ATM), internet protocol (IP), et cetera.

The hardware aspect of each of the various data transmission protocols specifies a termination impedance. For example, the ADSL transmission protocol defines the line termination impedance to be 100 Ohms. As a further example, SHDSL transmission protocol defines the line termination impedance to be 135 Ohms. If a line driver is to be used in a dedicated system (e.g., used in an ADSL system or SHDSL system only) the line driver can be designed to have the appropriate termination impedance. If, however, a line driver is to be used in communication systems that support multiple data transmission protocols, the impedances comprising the line driver must be changed depending on the data transmission protocol being supported. Typically, the line driver will be implemented on an integrated circuit that is mounted on a printed circuit board along with resistors. One common approach for changing the impedance of the line driver is to change the resistor values on the printed circuit board.

Therefore, a need exists for a line driver that has variable termination impedance that can be used in a variety of data transmission protocols without having to vary components on a printed circuit board.

DETAILED DESCRIPTION OF A PREFERRED EMBODIMENT

Generally, the present invention provides a line driver having variable impedance termination that includes an impedance, a $1^{st}$ variable feedback, a $2^{nd}$ variable feedback, a summing module and a gain module. The $1^{st}$ and $2^{nd}$ variable feedbacks provide feedback based on the desired impedance for the particular application. For example, if the line driver is used in an SHDSL environment, the $1^{st}$ and $2^{nd}$ variable feedbacks would be set such that the termination impedance is 135 Ohms. The summing module is operably coupled to sum the $1^{st}$ variable feedback, the $2^{nd}$ variable feedback and a signal to produce a resultant signal. The gain module is operably coupled to receive the resultant signal and to amplify the signal to produce a gained signal. The output of the gain module is operably coupled to the impedance wherein the other node of the impedance provides the output of the line driver. To provide the feedback, the $1^{st}$ variable feedback is operably coupled to the output of the gain module and the summing module and the $2^{nd}$ variable feedback is operably coupled to the output of the line driver and the summing module. With such a line driver, its termination impedance can be varied through a control signal, register read-write, automatic configuration, et cetera, without having to change components on a printed circuit board. As such, the line driver may be used for a variety of data transmission protocols without the need for customized parts or customized circuit boards.

Figure 1:
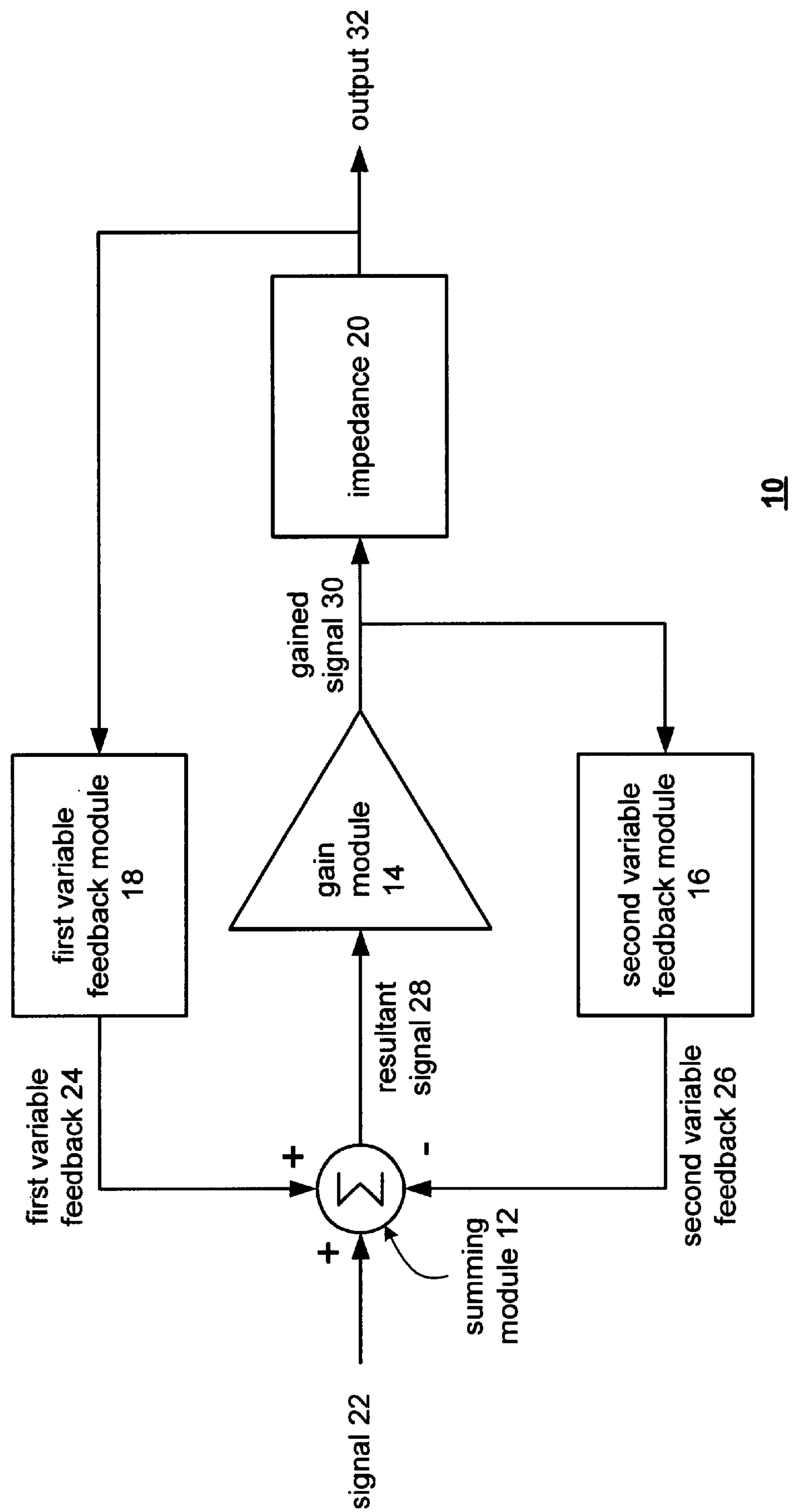
FIG. 1 illustrates a schematic block diagram of a line driver having a variable impedance termination in accordance with the present invention.

The present invention can be more fully described with reference to FIGS. 1 through 5. FIG. 1 illustrates a schematic block diagram of a line driver 10 that includes a summing module 12, a gain module 14, a $1^{st}$ variable feedback module 18, a $2^{nd}$ variable feedback module 16, and an impedance 20. The $1^{st}$ variable feedback module 18 is operably coupled to the output 32 and to provide a $1^{st}$ variable feedback 24 to the summing module 12. The $2^{nd}$ variable feedback module 16 is operably coupled to the output of the gain module 14 and to provide a $2^{nd}$ variable feedback 26 to the summing module 12. The $1^{st}$ and $2^{nd}$ variable feedback modules 18 and 16 may be implemented utilizing active and/or passive components that are arranged to provide a selectable impedance. For example, the $1^{st}$ and $2^{nd}$ variable feedback modules 18 and 16 may be implemented utilizing a resistor network that includes a resistive divider with multiple taps, a resistive divider with a variable resistor, and/or a plurality of resistors and a plurality of switches interoperably coupled to provide various impedances. In addition, the $1^{st}$ and $2^{nd}$ variable feedback modules may be implemented utilizing a combination of resistors and switch capacitor circuits to provide a variable impedance. The selection of the variable impedance is based on the termination impedance prescribed by the particular data transmission protocol. For example, 135 Ohms for SHDSL and 100 Ohms for ADSL.

The summing module 12 is operably coupled to add the $1^{st}$ variable feedback 24 with the signal 22 and subtracting therefrom the $2^{nd}$ variable feedback 26 to produce a resultant signal 28. The resultant signal 28 is provided to the gain module 14, which amplifies the magnitude of the resultant signal 28 to produce a gained signal 30. The gain signal 30 is provided to impedance 20 wherein the impedance provides output 32. Note that the impedance 20 may be a resistor that is sized to provide minimal loss for line driver 10 wherein a majority of the termination impedance is produced by the components contained within the $1^{st}$ and $2^{nd}$ variable feedbacks 16 and 18 and the gain module 14.

Figure 2:
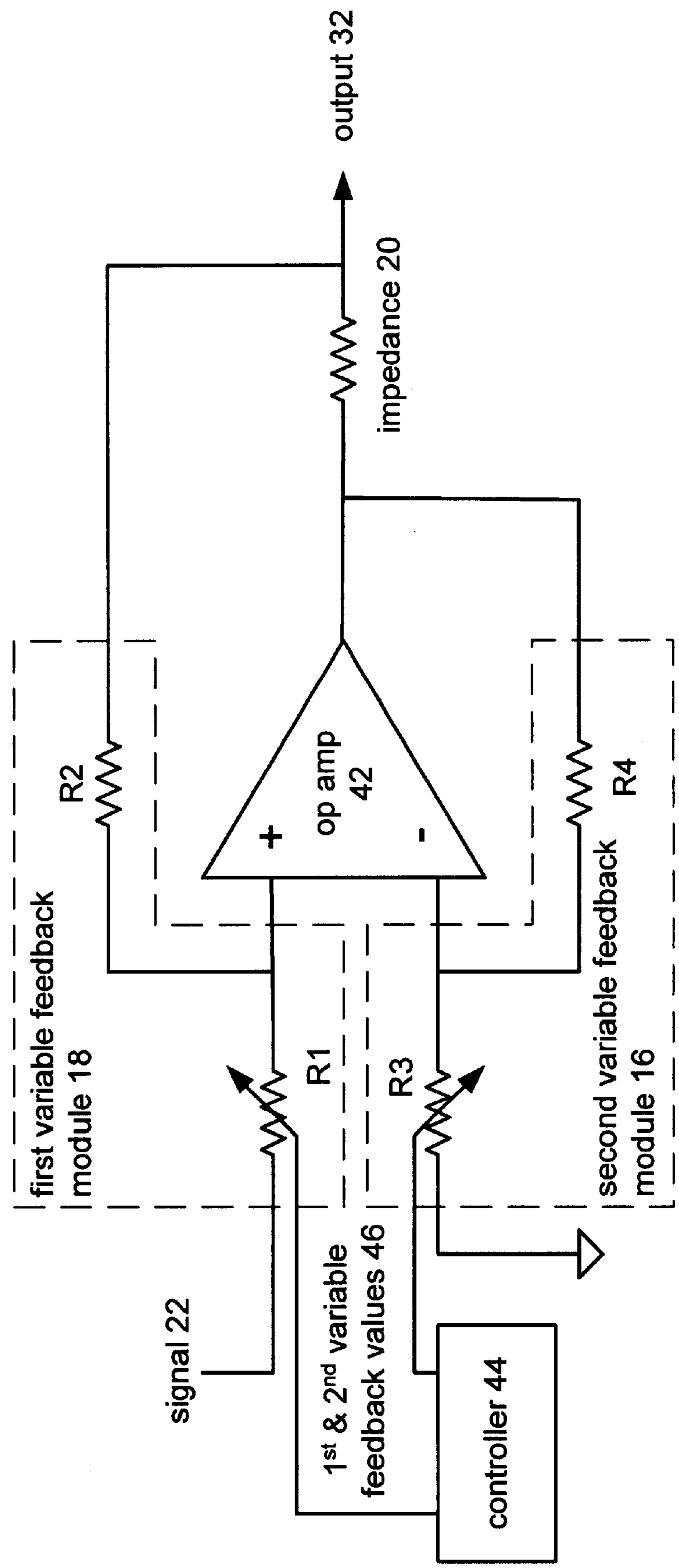
FIG. 2 illustrates a schematic block diagram of an alternate line driver having variable impedance termination in accordance with the present invention.

FIG. 2 illustrates a line driver 40 that includes the $1^{st}$ and $2^{nd}$ variable feedback modules 18 and 16, a controller 44, an operational amplifier 42, and a resistive impedance 20. The $1^{st}$ variable feedback module 18 includes a variable resistor R1 and a feedback resistor R2. The $2^{nd}$ variable feedback module 16 includes a variable resistor R3 and a feedback resistor R4. The controller 44 produces $1^{st}$ and $2^{nd}$ variable feedback values 46 that are provided to the variable resistors R1 and R3 of the $1^{st}$ and $2^{nd}$ variable feedback modules 18 and 16. As one of average skill in the art will appreciate, resistors R2 and R4 may also be variable.

Based on the $1^{st}$ and $2^{nd}$ variable feedback values 46, the resistors R1 and R3 (and optionally R2 and R4) are selected to provide a desired impedance such that the termination impedance for the entire line driver 40 is at a desired level. The controller 44 may include programmable registers to store the $1^{st}$ and $2^{nd}$ variable feedback values, switches to set the $1^{st}$ and $2^{nd}$ variable feedback values, and/or an automatic impedance synthesis module coupled to automatically determine the impedance to synthesize. Such an automatic impedance synthesis module would determine the desired impedance during a training sequence of the particular data transmission protocol in any known manner.

The signal 22 is operably coupled to the variable resistor R1 while variable resistor R3 is coupled to a common mode voltage for the system, or vice versa. Resistors R2 and R4 are coupled to the impedance 20 as shown. As one of average skill in the art will appreciate, resistors R2 and R4 may be fixed resistors or variable resistors. As one of average skill in the art will further appreciate, an alternate embodiment of the line driver 40 would have the signal 22 coupled to resistor R3 and resistor R1 coupled to the common mode voltage. In this configuration, a single ended output 32 is produced that will have a DC level based on the input DC level.

Figure 3:
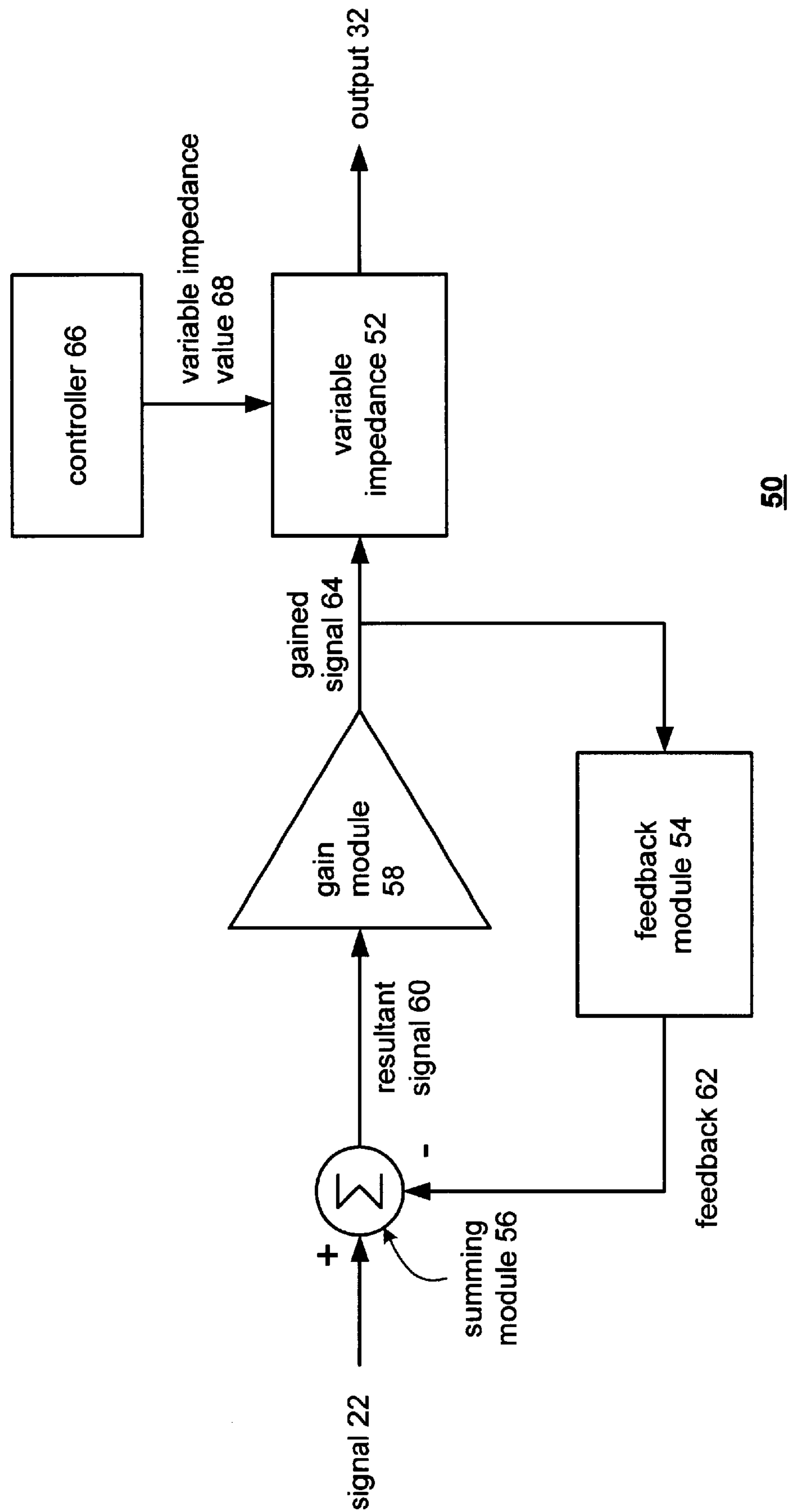
FIG. 3 illustrates a schematic block diagram of another line driver having variable impedance termination in accordance with the present invention.

FIG. 3 illustrates a line driver 50 that includes a summing module 56, a gain module 58, a feedback module 54, a variable impedance 52 and a controller 66. The feedback module 54 is operably coupled to the output of the gain module 58 to produce feedback 62 to the summing module 56. The summing module 56 subtracts the feedback 62 from the signal 22 to produce a resultant signal 60. The gain module amplifies the magnitude of the resultant signal 60 to produce a gained signal 64.

The variable impedance 52 is operably coupled to receive the gain signal 64 and produce an output 32 therefrom. The controller 66 provides a variable impedance value 68 to the variable impedance 52 such that the termination impedance of line driver 50 is at a desired value. Note that the variable impedance 52 may be constructed utilizing a resistive divider network with multiple taps, a variable resistor, and/or a plurality of resistors and a plurality of switches. Further note that the controller 66 may have a similar construct to controller 44 or controller 66 may be implemented via jumpers and/or switches on a printed circuit board.

Figure 4:
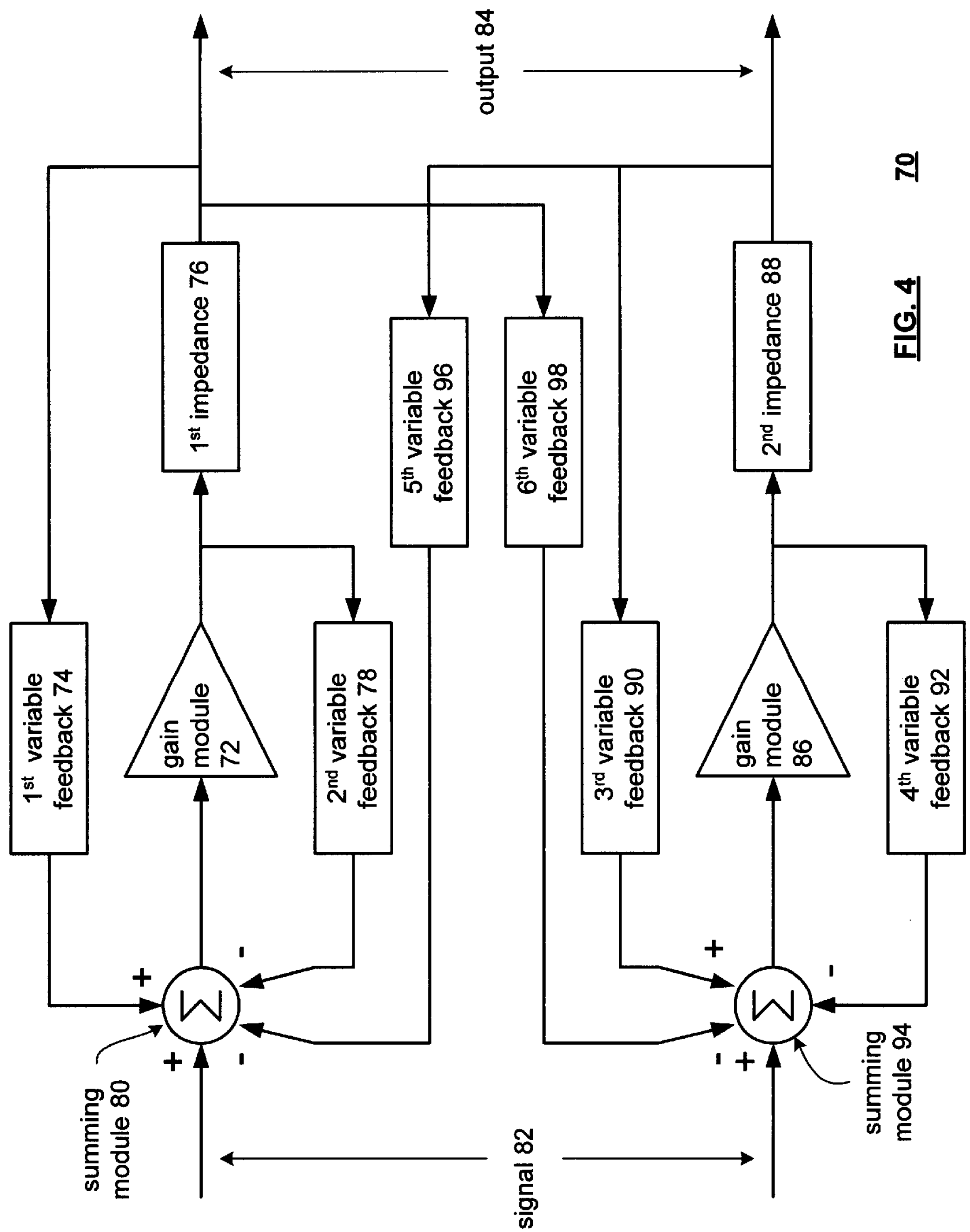
FIG. 4 illustrates a schematic block diagram of yet another line driver having variable impedance termination in accordance with the present invention.

FIG. 4 illustrates a schematic block diagram of a differential line driver 70 that includes a summing module 80, a $1^{st}$ gain module 72, $2^{nd}$ variable feedback 78, $1^{st}$ impedance 76, summing module 94, $4^{th}$ variable feedback 92, $2^{nd}$ gain module 86, $2^{nd}$ impedance 88, and may optionally include a $1^{st}$ variable feedback 74, a $3^{rd}$ variable feedback 90, a $5^{th}$ variable feedback 96, and a $6^{th}$ variable feedback 98. In this embodiment, a signal 82 is provided to an input of the $1^{st}$ summing module 80 and the $2^{nd}$ summing module 94. Note that each of the variable feedbacks 74, 78, 90, 92, 96 and 98 may be implemented utilizing a variable resistor, a resistor divider network having a plurality of taps, and/or a plurality of resistors and switches interoperably coupled to selectively produce variable impedances.

The gain module 72 and summing module 80 may comprise an operational amplifier having a $1^{st}$ input, $2^{nd}$ input and an output. The $1^{st}$ and $2^{nd}$ nodes of the $1^{st}$ variable feedback are operably coupled to the $1^{st}$ input and output of the operational amplifier, respectively, wherein the $2^{nd}$ node of the variable feedback is operably coupled to the $2^{nd}$ input of the operational amplifier, and wherein the signal is operably coupled to the $1^{st}$ input of the operation amplifier. In this configuration, the summing module and amplifier are implemented utilizing a single operational amplifier. However, as one of average skill in the art will appreciate, the gain module 72 and summing module 80 may be implemented using discrete components. The same construct may be utilized for gain module 86 and summing module 94.

The summing module 80 is operably coupled to sum the signal 82 with the $1^{st}$ variable feedback 74 and subtract therefrom the $2^{nd}$ variable feedback 78 and, if included, the $5^{th}$ variable feedback 96. As one of average skill in the art will appreciate, the line driver circuit 70 may include either the $1^{st}$ variable feedback 74 or the $5^{th}$ variable feedback 96 or both. Similarly, the line driver 70 may include the $3^{rd}$ variable feedback 90 and/or the $6^{th}$ variable feedback 98.

The output of the summing module 80 is provided to the gain module 72, which produces a gained signal. The $1^{st}$ impedance 76 receives the gain signal and produces one of the differential outputs of output 84.

Summing module 94 is operably coupled to sum the signal 82 with the $3^{rd}$ variable feedback 90 and subtract therefrom the $4^{th}$ variable feedback 92 and/or the $6^{th}$ variable feedback 98. The resultant signal is provided to gain module 86, which amplifies the gain of the resultant signal. The gain signal is provided to the $2^{nd}$ impedance 88, which provides the other leg of the differential output 84.

The differential line driver 70 may further include a controller that produces the $1^{st}$, $2^{nd}$, $3^{rd}$ and $4^{th}$ variable feedback values based on desired matched impedances. If the line driver includes the $5^{th}$ and $6^{th}$ variable feedback, then the controller would also produce values for those variable feedbacks as well. The controller may have a construct as previously described.

As one of average skill in the art will appreciate, various components of the line driver 70 of FIG. 4 may be omitted, rearranged, and/or implemented differently. For example, the $1^{st}$ and $3^{rd}$ variable feedbacks 74 and 90 may be omitted. As a further example, the $5^{th}$ and $6^{th}$ variable feedbacks 96 and 98 may be omitted. As another example, summing modules 80 and 94 may be implemented using a four input differential output operational amplifier.

Figure 5:
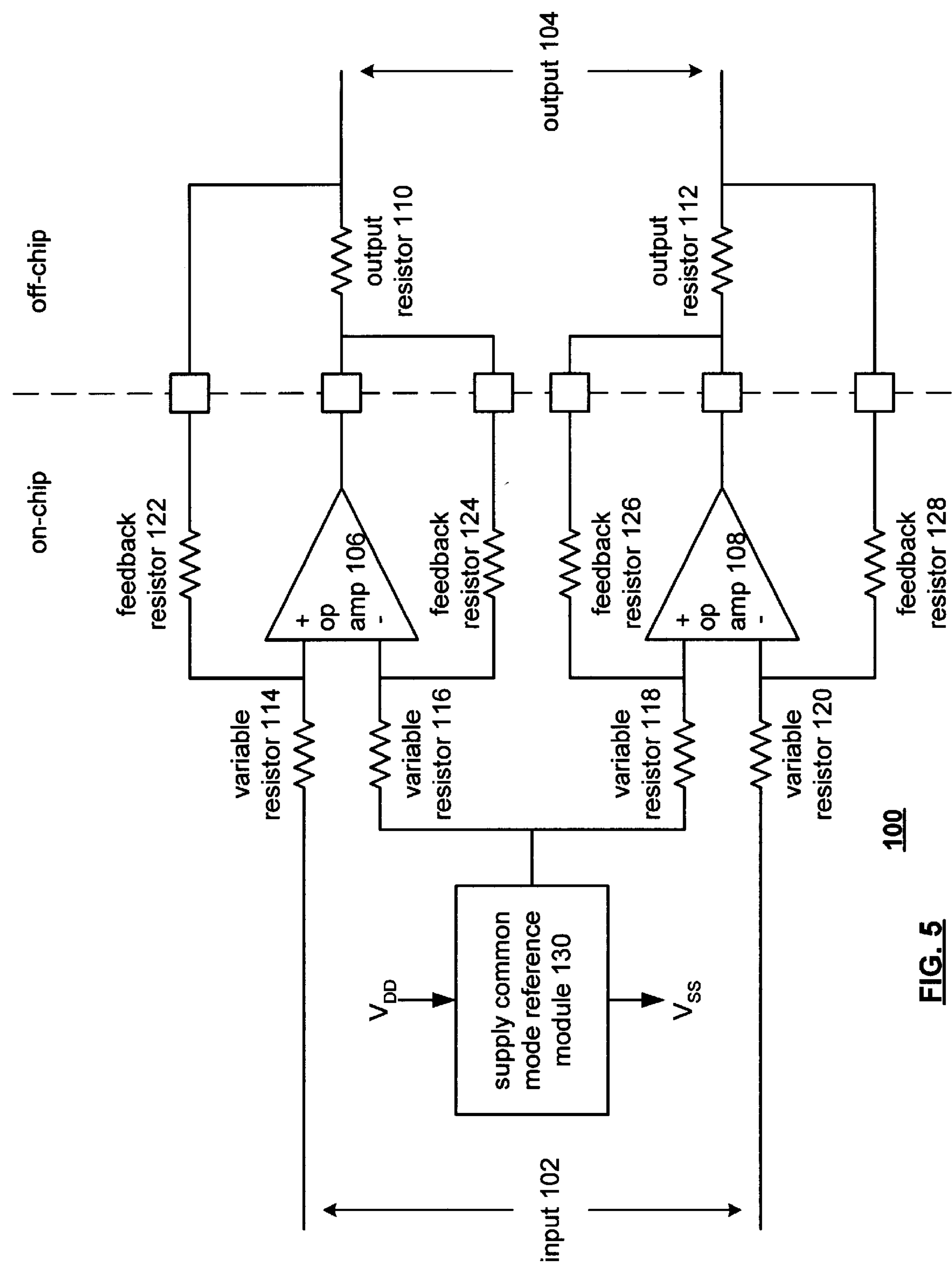
FIG. 5 illustrates a schematic block diagram of a further line driver having variable impedance termination in accordance with the present invention.

FIG. 5 illustrates a schematic block diagram of a differential line driver 100. The line driver 100 includes operational amplifiers 106 and 108, a supply common mode reference module 130, variable resistors 114, 116, 118 and 120, feedback resistors 122, 124, 126 and 128, which may be variable, and output resistors 110 and 112. The line driver 100 is separated into an on-chip portion and an off-chip portion. The on-chip portion may be constructed on an integrated circuit wherein the off-chip portion is on a printed circuit board supporting the integrated circuit. Note that the on-chip portion may further include a controller that sets the variable resistors 114 through 128.

In operation, an input 102 is received via variable resistors 114 and 120. The operational amplifiers 106 and 108 produce an output based on the corresponding feedback resistors 122, 124, 126 and 128, which may be fixed or variable resistors, in conjunction with the variable resistors 114, 116, 118 and 120. The output of the operational amplifiers is provided to output resistors 110 and 112 to produce the differential output 104.

The preceding discussion has presented a line driver having variable impedance termination. Such a line driver may be utilized in a variety of communication systems that support different data transmission protocols without the need for customized integrated line driver circuits and without the need for customized printed circuit boards. As one of average skill in the art will appreciate, other embodiments may be derived from the teachings of the present invention without deviating from the scope of the claims.

What is claimed is:

1. A line driver having variable impedance termination, the line driver comprises:

an impedance having a first node and a second node;

first variable feedback module operably coupled to the first node of the impedance to provide a first variable feedback;

second variable feedback module operably coupled to the second node of the impedance to provide a second variable feedback;

summing module operably coupled to sum the first variable feedback, the second variable feedback, and a signal to produce a resultant signal; and gain module having an input and an output, wherein the input of the gain module is operably coupled to receive the resultant signal and to produce therefrom a gained signal, wherein the output of the gain module is operably coupled to the first node of the impedance such that the gained signal is provided to the impedance, wherein the second node of the impedance provides an output of the line driver.

2. The line driver of claim 1 further comprises a controller to produce first and second variable feedback values based on desired matched impedance, wherein the first variable feedback module produces the first variable feedback based on the first variable feedback value and wherein the second variable feedback module produces the second variable feedback based on the second variable feedback value.

3. The line driver of claim 2, wherein the controller further comprises at least one of: programmable registers to store the first and second variable feedback values, switches to set the first and second variable feedback values, and auto impedance synthesis module operably coupled to automatically determine impedance to synthesize.

4. The line driver of claim 1, wherein the first variable feedback module further comprises a resistor network that includes at least one of: a resistive divider with multiple taps, a resistive divider with a variable resistor, and a plurality of resistors and a plurality of switches.

5. The line driver of claim 1, wherein the second variable feedback module further comprises a resistor network that includes at least one of: a resistive divider with multiple taps, a resistive divider with a variable resistor, and a plurality of resistors and a plurality of switches.

6. The line driver of claim 1, wherein the summing module and gain module further comprise an operational amplifier having a first input, a second input, and an output, wherein the first variable feedback module is operably coupled between the first input and the output, wherein the second variable feedback module is operably coupled between the second input and the output, and wherein the signal is operably coupled to the first input such that the output provides the resultant signal.

7. A line driver having variable impedance termination, the line driver comprises:

a variable impedance having a first node and a second node;

feedback module operably coupled to the first node of the variable impedance to provide a feedback;

summing module operably coupled to sum the feedback and a signal to produce a resultant signal; and gain module having an input and an output, wherein the input of the gain module is operably coupled to receive the resultant signal and to produce therefrom a gained signal, wherein the output of the gain module is operably coupled to the first node of the variable impedance such that the gained signal is provided to the variable impedance, wherein the second node of the variable impedance provides an output of the line driver.

8. The line driver of claim 7 further comprises a controller to produce a variable impedance value based on desired matched impedance, wherein the variable impedance produces a desired impedance based on the variable impedance value.

9. The line driver of claim 7, wherein the summing module and gain module further comprise an operational amplifier having a first input, a second input, and an output, wherein the feedback module is operably coupled between the first input and the output, wherein the output is coupled to the first node of the variable impedance, and wherein the signal is operably coupled to the second input.

10. A line driver having variable impedance termination, the line driver comprises:

a first impedance having a first node and a second node;

a second impedance having a first node and a second node;

a first summing module having a first input, a second input, a third input, and an output;

a second summing module having a first input, a second input, a third input, and an output;

first variable feedback having a first node and a second node;

second variable feedback having a first node and a second node;

third variable feedback having a first node and a second node;

fourth variable feedback having a first node and a second node;

first gain module having an input and an output;

second gain module having an input and an output, wherein:

the second nodes of the first and second impedances provide a differential output, the output of the first gain module is operably coupled to the first node of the first impedance, the output of the second gain module is operably coupled to the first node of the second impedance, the second node of the first variable feedback is coupled to the second node of the first impedance, the first node of the first variable feedback is coupled to the first input of the first summing module, the second node of the third variable feedback is coupled to the second node of the second impedance, the first node of the third variable feedback is coupled to the first input of the second summing module, the second inputs of the first and second summing modules are operably coupled to receive an input signal;

the first node of the second variable feedback is coupled to the third input of the first summing module, the first node of the fourth variable feedback is coupled to the third input of the second summing module, the output of the first summing module is operably coupled to the input of the first gain module, the output of the second summing module is operably coupled to the input of the second gain module, the second node of the second variable feedback is operably coupled to either the first node of the first impedance or the first node of the second impedance, and the second node of the fourth variable feedback is operably coupled to either the first node of the first impedance of the first node of the second impedance.

11. The line driver of claim 10 further comprises:

a fifth variable feedback having a first node and a second node; and a sixth variable feedback having a first node and a second node, wherein, when the second node of the second variable feedback is operably coupled to the second node of the first impedance and the second node of the fourth variable feedback is operably coupled to the second node of the second impedance, the first node of the fifth variable feedback is operably coupled to a fourth input of the first summing module and the second node of the fifth variable feedback is operably coupled to the second node of the second impedance, the first node of the sixth variable feedback is operably coupled to a fourth input of the second summing module, and the second node of the sixth variable feedback is operably coupled to the second node of the first impedance.

12. The line driver of claim 10 further comprises a controller to produce first, second, third, and fourth variable feedback values based on desired matched impedance, wherein the first variable feedback is set based on the first variable feedback value, wherein the second variable feedback is set based on the second variable feedback value, wherein the third variable feedback is set based on the third variable feedback value, and wherein the fourth variable feedback is set based on the fourth variable feedback value.

13. The line driver of claim 10, wherein the first summing module and the first gain module further comprise an operational amplifier having a first input, a second input, and an output, wherein the first and second nodes of the first variable feedback are operably coupled to the first input and the output of the operational amplifier, respectively, wherein the second node of the second variable feedback is operably coupled to the second input of the operational amplifier, and wherein the signal is operably coupled to the first input of the operational amplifier.

14. The line driver of claim 10, wherein the second summing module and the second gain module further comprise an operational amplifier having a first input, a second input, and an output, wherein the first and second nodes of the third variable feedback are operably coupled to the first input and the output of the operational amplifier, respectively, wherein the second node of the fourth variable feedback is operably coupled to the second input of the operational amplifier, and wherein the signal is operably coupled to the first input of the operational amplifier.

15. A line driver having variable impedance termination, the line driver comprises:

a first operational amplifier having a first input, a second input, and an output;

a second operational amplifier having a first input, a second input, and an output;

a first variable resistor operably coupled to receive an input signal and to the first input of the first operational amplifier;

a second variable resistor operably coupled to the second input of the first operational amplifier and to a common mode reference;

a third variable resistor operably coupled to the first input of the second operational amplifier and to the common mode reference;

a fourth variable resistor operably coupled to receive the input signal and to the second input of the second operational amplifier;

a first output resistor operably coupled to the output of the first operational amplifier;

a second output resistor operably coupled to the output of the second operation amplifier, wherein the first and second output resistor provide a difference output;

a first feedback resistor operably coupled to the first input of the first operational amplifier and the first output resistor;

a second feedback resistor operably coupled to the second input and the output of the first operational amplifier;

a third feedback resistor operably coupled to the first input and the output of the second operational amplifier; and a fourth feedback resistor operably coupled to the second input of the second operational amplifier and to the second output resistor.

* * * * *